United States Patent [19]

Kinney

[11] 3,886,973

[45] June 3, 1975

[54] PRODUCTION OF A VARIEGATED PRODUCT

[75] Inventor: Alfred W. Kinney, Kansas City, Mo.

[73] Assignee: Phillips Petroleum Company, Bartlesville, Okla.

[22] Filed: July 9, 1973

[21] Appl. No.: 377,449

[52] U.S. Cl.................. 137/604; 141/105; 425/131
[51] Int. Cl............................................ F16k 19/00
[58] Field of Search..... 137/604; 141/105; 425/131, 425/133, 462, 463, 464

[56] References Cited
UNITED STATES PATENTS

| | | | |
|---|---|---|---|
| 2,669,946 | 2/1954 | Peyton | 137/604 X |
| 2,722,177 | 11/1955 | Routh | 425/131 X |
| 3,370,553 | 2/1968 | Rich et al. | 425/131 X |
| 3,453,689 | 7/1969 | Hume | 425/133 |
| 3,473,481 | 10/1969 | Brane | 137/604 X |

Primary Examiner—Robert G. Nilson

[57] ABSTRACT

A variegated product comprising a generally liquid material distributed within a generally plastic material is produced by flowing said plastic material through a mixing chamber wherein said liquid material is injected into the plastic material through one or more ribbon tubes. The combined product is then passed through a filler valve into a container. Variation of the orientation of the ribbon tube outlets with respect to the location of the plastic material inlet of the mixing chamber can be used to change the distribution of liquid material within the plastic material in the filled container to yield either an at least substantially uniformly variegated product wherein all components are visible through a transparent container or an at least substantially uniform variegated product in which the liquid material does not contact the container and is totally encapsulated within the plastic material.

27 Claims, 8 Drawing Figures

PATENTED JUN 3 1975 3,886,973

SHEET 1

3,886,973

PRODUCTION OF A VARIEGATED PRODUCT

This invention relates to a method and apparatus for packaging material in a container. In another aspect it relates to a method and apparatus for filling a container with a variegated plastic material. In still another aspect it relates to a method and apparatus for interspersing a first material within a second material. In yet another aspect it relates to a method and apparatus for interpersing a first material within a second material during the process of filling a container with a combination of said first and second materials.

In the production and packaging of many products, such as ice cream, where two or more materials, at least one of which is in a plastic state, are desired to be combined but not uniformly mixed, considerable emphasis must be placed on the combination of the constituent ingredients in a manner which yields a desirable pattern of distribution of each ingredient with respect to the other ingredients. In the case of ice cream, for example, it is often desirable to intersperse one or more colored and flavored syrups within a body of the basic ice cream compositions so that mixture of the various components is minimized but overall distribution of the component ingredients from one portion of the container to another is relatively uniform. In view of the fact that the product is normally consumed in individual quantities having a volume substantially smaller than the volume of the container in which the product is packaged, a proper distribution pattern of flavoring or coloring within the product is mandatory if consumable quantities of the product are to be uniform.

An object of the invention is to provide an improved method and apparatus for the production and packaging of variegated materials. Another object is to provide an improved method and apparatus for the production and packaging of a variegated product having one or more generally liquid materials interspersed within a generally plastic material. Yet another object is to provide an improved method and apparatus for the production and packaging of a variegated ice cream having one or more flavored or colored syrups dispersed within an ice cream base.

The present invention is capable of producing a uniformly variegated product having a uniform and highly desirable pattern of ingredient distribution. The invention is particularly suited for use in combining substances having different thermodynamic properties and different temperature-related viscosity characteristics. Through its different embodiments, the invention is also readily adaptable for use in either transparent packaging methods in which display of the variegated nature of the product is possible through the transparent package or with packaging methods where it may be desirable for only one component ingredient to contact the container walls in order that container wall temperature variation inherent in the handling associated with the distribution and sale of the product will have a minimal effect on the uniformity and quality of the product.

Figure 1:
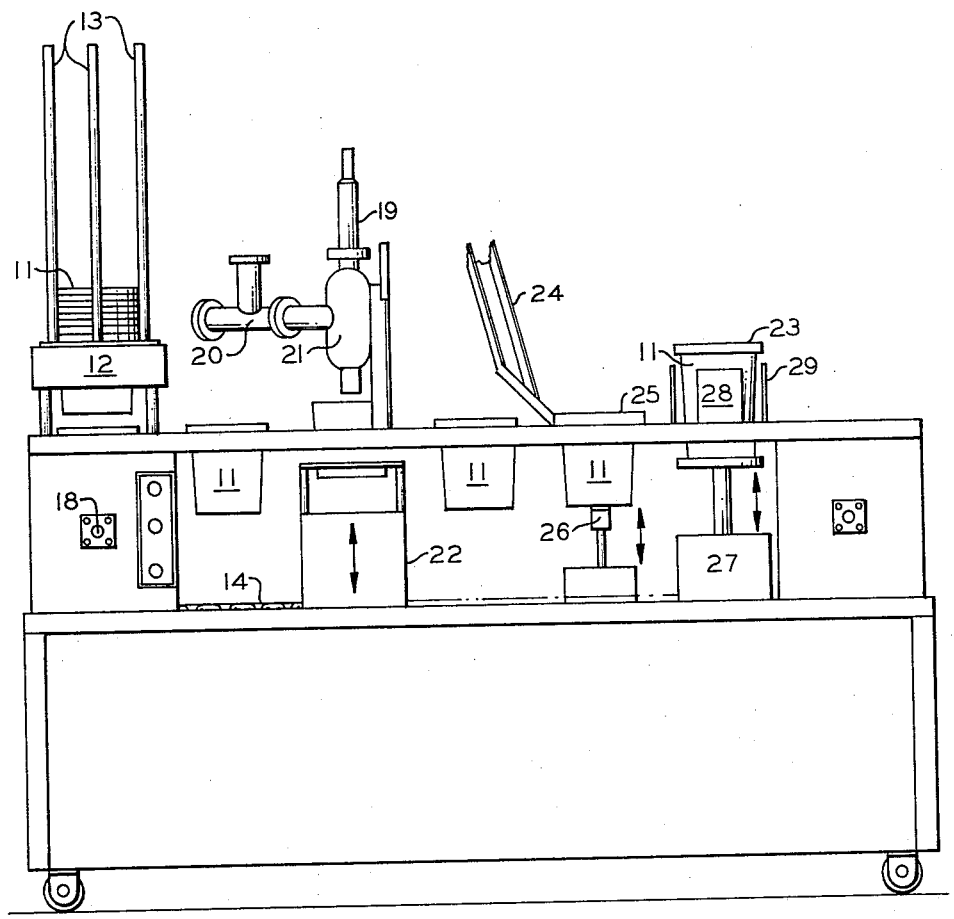
FIG. 1 is a front elevational view of a packaging system which is compatible with the method and apparatus of the invention.

Referring now to FIG. 1, a nested stack of containers 11 is supported by container dispensing mechanism 12 and four vertical guide rods 13 over the upper run of an endless conveyor 14. Conveyor 14 is indexed in a stepwise manner by drive axle 18. During the dwell portion of each step or cycle, mechanism 12 separates the lowermost container 11 from the stack and drops the separated container onto a container support which is positioned on conveyor 14 below dispensing mechanism 12. Tee 20 combines a plurality of ingredients and carries them to filler valve 21. Filler valve 21 is actuated during the dwell portion of each cycle by valve actuating means 19 to introduce the material to be packaged into the container 11 positioned in the filling station of the conveyor. If desired, a container lift mechanism 22 can be employed to raise the container 11 to be filled so that the outlet end of filler valve 21 is inside the container and adjacent the bottom of the container before the filler valve 21 is actuated. Mechanism 22 can then gradually lower the container as it is being filled.

Closures 23 are fed into chute 24, the lower end of which is positioned over conveyor 14, in such a manner that the leading edge of the lowermost closure is contacted by the leading edge of the rim of the container 11 as conveyor 14 indexes the filled container into the capping station. The forward motion of the container 11 draws the engaged closure 23 from chute 24, while the contact of the upper surface of the closure 23 with a horizontal plate 25 forces the closure 23 down onto the rim of the container 11. If desired, container marking mechanism 26 can be actuated during the dwell portion of each cycle to raise the container 11 and the associated closure 23 into firm contact with plate 25 to firmly seal the closure 23 on the container 11 and to apply indicia to the bottom of the container.

During the dwell portion of each cycle, lift mechanism 27 is actuated to raise the filled and capped container which is in the transfer station of conveyor 14 to a position above the conveyor, and transfer mechanism 28 is actuated to move the elevated container laterally of conveyor 14 and into an output chute 29.

Figure 2:
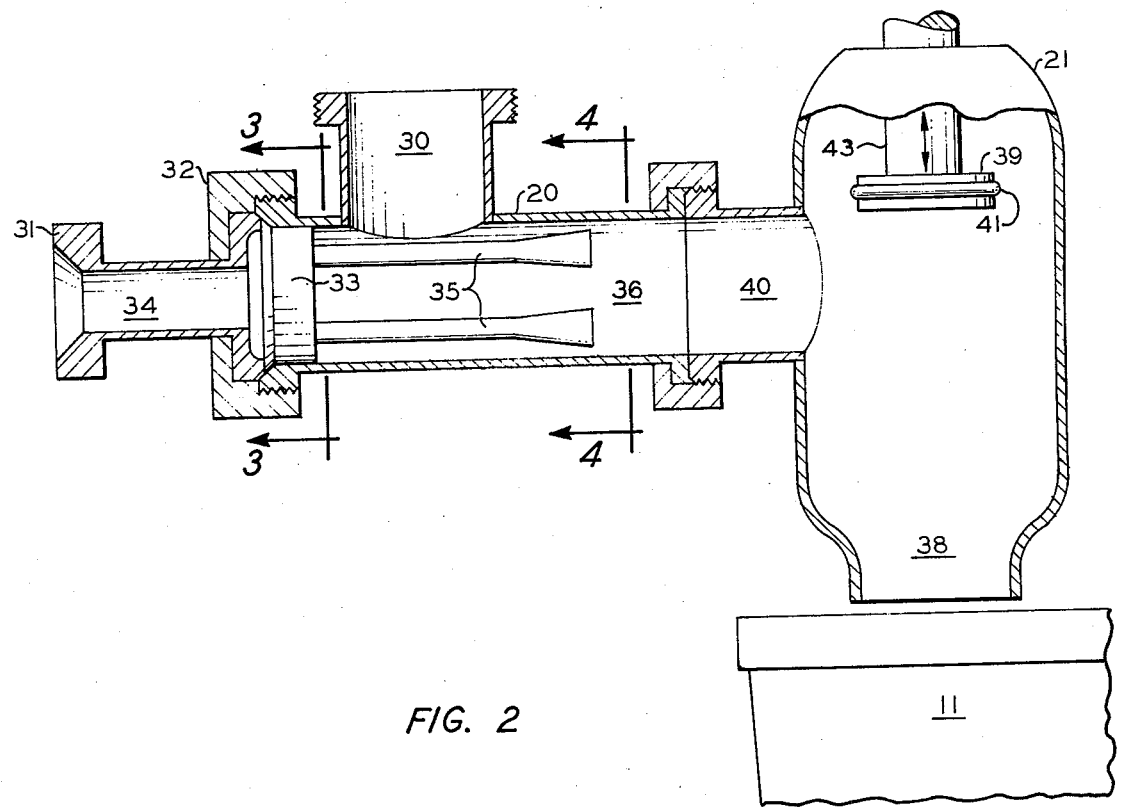
FIG. 2 is a vertical cross section of the filler mechanism of the system shown in FIG. 1.

FIG. 2 shows a cross-sectional representation of the tee 20 and filler valve 21 which can be constructed from stainless steel or any other suitable material. Tee 20 has an inlet 30 for the plastic material, e.g., ice cream, and an inlet 31 for the liquid material, e.g., syrup. Inlets 30 and 31 are both upstream from filler valve 21 with upstream inlet 31 located further from filler valve 21 than intermediate inlet 30. Fastening device 32 secures upstream inlet tube 31 and disc 33 to the main body of tee 20. One or more ribbon tubes 35 of equal length extend through disc 33 to provide fluid communication between the inlet passageway 34 and the interior of the main body of tee 20. Although use of one upstream inlet passageway 34 to supply all ribbon tubes 35 is illustrated, modification of the upstream inlet and ribbon tube structures by methods known in the art can be used to incorporate additional upstream inlets in the design of the tee 20 so that different ribbon tubes 35 are supplied by different upstream inlets, thereby permitting the use of more than one type of liquid. In operation, a generally plastic material is forced through intermediate inlet 30. As the plastic material flows past the ends of ribbon tubes 35 toward filler valve 21, ribbons of liquid from ribbon tubes 35 are deposited within the flowing body of plastic material. The flow of plastic material into ribbon tubes 35 is prevented by maintaining a liquid pressure in ribbon tubes 35 which is higher than the plastic material pressure in tee 20.

From tee 20 the plastic material containing ribbons of liquid flows through filler valve 21 and out filler valve opening 38 into container 11. Valve closure means 39, operated by valve actuating means 19 (FIG. 1), controls the flow of product from filler valve 21 by interrupting the flow of product during the time required for conveyor 14 (FIG. 1) to move the next container 11 into position beneath filler valve 21. Although the use of any filler valve is considered to be within the scope of the invention, a preferred valve is one having a valve inlet 40 of the same diameter as the straight passageway 36 of tee 20, and an outlet 38 of smaller diameter than the inlet 40, the diameter of the main body of the valve between outlet 38 and inlet 40 being larger in diameter than either the outlet 38 or inlet 40. A more preferred filler valve 21 is a valve wherein the direction of product flow through said inlet 40 is generally at a right angle to the direction of product flow through said outlet 38 and wherein said valve closure means 39 is removed from the product stream when the valve is open. A preferred closure means 39 is generally disc-shaped with an annular groove around its circumference capable of accepting an O-ring 41 and is operably connected by connecting means 43 to double-acting valve actuating means 19. In the preferred valve, closure means 39 is withdrawn from the area of product flow by actuating means 19 during the filling of container 11 and is inserted into the area of product flow, moving in a direction parallel to the flow of product from valve outlet 38 to momentarily stop the product flow.

Figure 3:
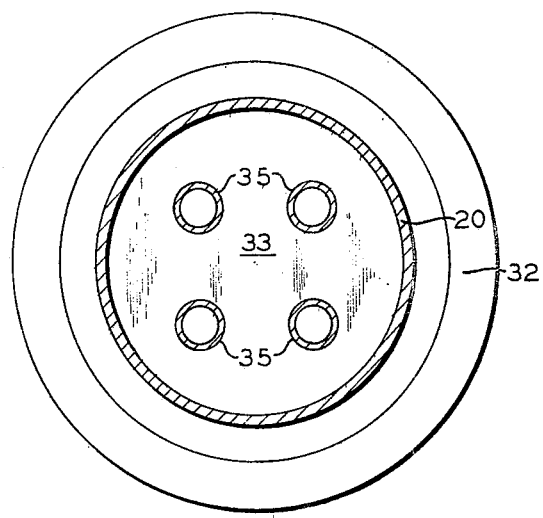
FIG. 3 is a vertical cross section taken along the line 3—3 in FIG. 2.

As shown by FIG. 3, the upstream ends of ribbon tubes 35 toward liquid inlet 31 have a generally circular cross section to aid in fastening them to disc 33. The liquid ribbon tubes are equally spaced around the central axis of the straight passageway 36 of mixing tee 20 and each ribbon tube 35 is approximately equidistant between the central axis of the straight passageway 36 of mixing tee 20 and the inside wall of the straight passageway 36 of mixing tee 20.

Figure 4:
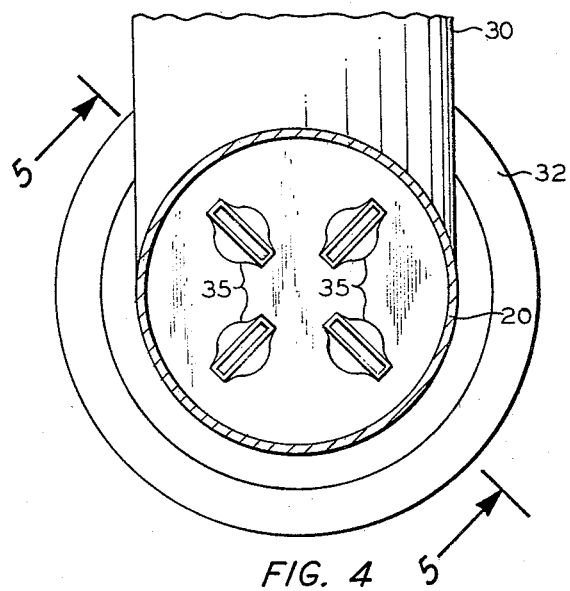
FIG. 4 is a vertical cross section taken along the line 4—4 in FIG. 2.

As shown by FIG. 4, the downstream ends of ribbon tubes 35 are flattened and elongated to form an opening at the end of each tube which is substantially longer than the diameter of the circular tube and has a very narrow width. The width of the opening can be as narrow as is practical depending upon the nature of the material which is dispensed through ribbon tubes 35. For dispensing materials containing fibrous matter or similar material which is not completely liquid, the opening must be large enough to accommodate any solid or fibrous components of the material. The ratio of width to length of the tube openings can range from about 1:1.5 to about 1:30 or more. A preferred range is from about 1:2.5 to about 1:15, a more preferred range being from about 1:4 to about 1:10. Excellent results have been achieved with tube opening widths of about 1/16 inch to about 3/32 inch for ribbon tubes 35 approximately 5/16 inch diameter within a straight passageway 36 approximately 2 inches in diameter. Ribbon tubes 35 are oriented so that the longer axis of each elongated downstream tube end extends at least substantially radially from the central axis of the straight passageway 36 of the mixing tee 20. When four ribbon tubes 35 are used, as illustrated, best results are achieved when the ribbon tubes 35 are positioned so that lines formed by the extension of the longer axes of the ribbon tubes 35 to the central axis of the straight passageway 36 of mixing tee 20 form angles of 45°, 135°, 225°, and 315° with respect to a line formed by the extension of the central axis of inlet 30 to the central axis of straight passageway 36 of mixing tee 20. If a different number of ribbon tubes 35 or a slightly different tee 20 configuration is used, the ribbon tubes 35 should be positioned so that a line passing through and perpendicular to the central axes of the two adjacent ribbon tubes 35 positioned nearest intermediate inlet 30 is bisected by a plane passing through the central axis of straight passageway 36 and the center of the opening of intermediate inlet 30 at its junction with straight passageway 36.

Figure 5:
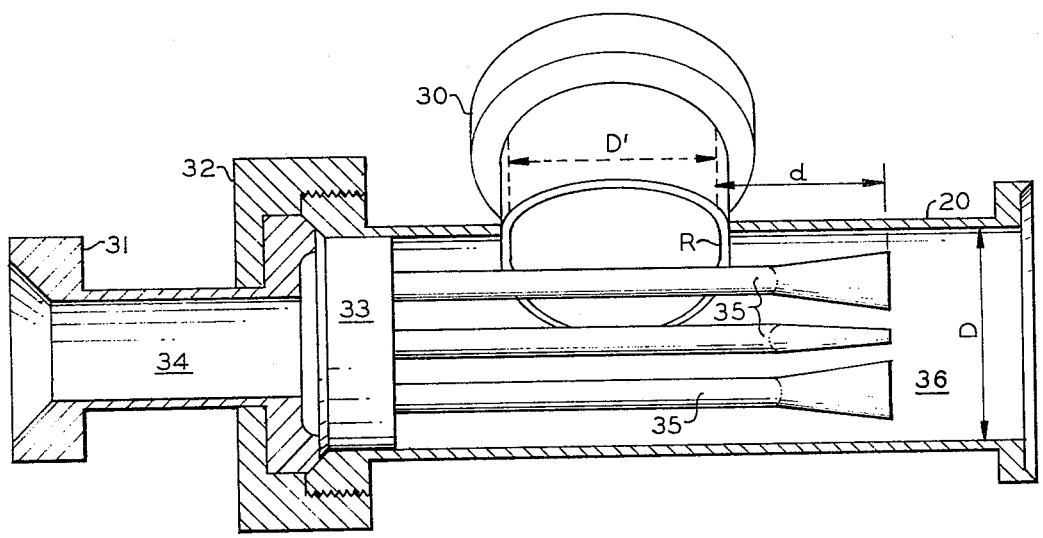
FIG. 5 is a cross section taken along line 5—5 in FIG. 4.

The shaping of ribbon tubes 35 to form a long, narrow opening at the end nearer filler valve 21 is clearly shown in FIG. 5. The length of ribbon tubes 35 is one of the primary factors which determine the pattern of material distribution within the finished product. In a mixing tee 20 wherein the straight passageway 36 has a diameter D and the intermediate inlet 30 has an inner diameter D' with D and D' being at least substantially equal, wherein the length of straight passageway 36 is at least 2D, and wherein the downstream edge of intermediate inlet 30 is at least a distance D upstream of the downstream outlet of tee 20, excellent results have been obtained when liquid component contact with a transparent container cover is desired by positioning the downstream end of ribbon tubes 35 at a distance d downstream of a reference position R where d is within the range of about ¼ D to about D, preferably within the range of about ½ D to about ⅔ D. The reference position R for measuring distance $d$ to the outlet ends of ribbon tubes 35 is the plane perpendicular to the longitudinal axis of the straight passageway 36 of mixing tee 20 which passes through the point nearest filler valve 21 on the inside surface of intermediate inlet 30 at the confluence of intermediate inlet 30 and the straight passageway 36.

Figure 6:
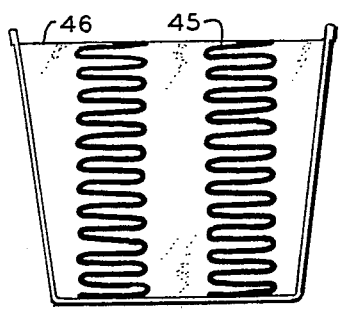
FIG. 6 shows the product ingredient distribution resulting from the use of apparatus illustrated in FIG. 5.

FIG. 6 shows the idealized distribution of material introduced by ribbon tubes 35 within a product resulting from the use of the embodiment of mixing tee 20 shown in FIG. 5. The liquid component inserted by ribbon tubes 35 is schematically represented by dark wavy lines showing the relative distribution of liquid material 45 within a generally plastic material 46. At the top and bottom of the container 11 the product surface contains both liquid material 45 and plastic material 46. The surface of the product contacting the sides of container 11 contains no liquid material 45. A product with such ingredient distribution is frequently desirable for use with containers having transparent tops since the ribbons of injected material will show through the transparent packaging.

Figure 7:
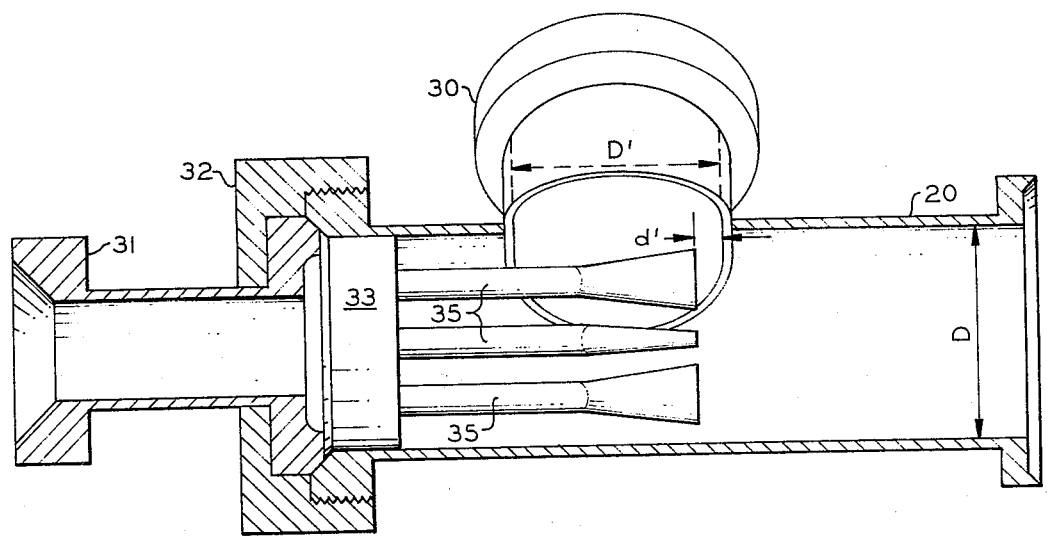
FIG. 7 is a cross section equivalent to FIG. 5 for another embodiment of the invention.

In the embodiment of FIG. 7, the ends of ribbons tubes 35 are located at a distance d' upstream, or away from filler valve 21, from the reference position R defined in the explanation of FIG. 5. Distance d' is within the range of zero to about ½ D, preferably within the range of about ⅛ D to about ¼ D.

Figure 8:
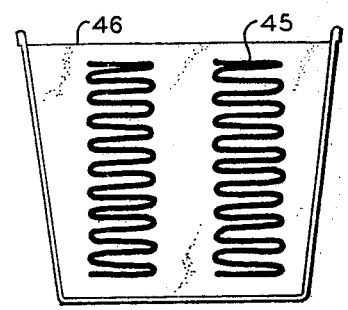
FIG. 8 shows the product ingredient distribution resulting from the use of the apparatus of FIG. 7.

FIG. 8 is an idealized representation of the product obtained by the use of the embodiment of mixing tee 20 shown by FIG. 7. The liquid component inserted by ribbon tubes 35 is schematically represented by dark wavy lines showing the relative distribution of liquid material 45 within a generally plastic material 46. The surface of the product contacting container 11, including the top and bottom product surfaces, contains no liquid material 45. The distribution of ingredients in this embodiment is particularly desirable for use with opaque packaging materials, or other applications where ability to view product distribution through the container 11 is not a factor, because the ingredients injected through the ribbon tubes 35 are completely encased in the material into which they are introduced. This configuration prevents pooling of injected material along the surfaces of the container and helps in maintaining the product in a stable condition during the handling associated with distribution and sale of the product.

In addition to providing a simple means by which to introduce a desirable pattern into a variegated product, formation of the downstream ends of ribbon tubes 35 into a long, narrow outlet configuration as shown by FIG. 4 enhances the quality of the overall product when used in a process such as ice cream production where the greater surface area of the material introduced by ribbon tubes 35 per unit weight of such material contributes to more rapid thermal equilibrium within the product. In the case of ice cream, when warm syrup is introduced into an ice cream stream using a tube having a circular outlet cross section, for example, transfer of the heat from the syrup stream to the surrounding ice cream through the relatively small surface area of the syrup can result in melting of the ice cream immediately surrounding the syrup. Melting of ice cream in this manner, then refreezing during storage prior to consumption, results in deterioration of the quality of the product. In particular, formation of large, hard, icy crystals and separation of the components of the basic ice cream material are likely to result whenever the ice cream is melted and refrozen. Pooling of warm syrup in pockets within the product as a result of slow cooling in the area immediately surrounding the syrup deposit is also a problem. In addition to melting the surrounding ice cream, such pooling results in poor distribution of syrup within the product due to the tendency of the syrup to run to the bottom of the container as the less dense ice cream material below it is melted. When the syrup is deposited in a thin ribbon, as provided by the invention, the syrup is cooled so quickly that melting, and crystallization upon refreezing, of ice cream immediately surrounding the syrup is not a problem. In addition, rapid cooling of the syrup quickly increases its viscosity and prevents pooling or formation of syrup pockets within the product.

Although the invention is particularly well suited for use in producing variegated ice cream, it is not limited in scope to a particular product and can be used for the production of any other variegated product for which it is suitable, particularly where a fluid of a first viscosity is introduced into a stream of a second fluid having a higher viscosity. Examples of such products are fruit syrup or flavoring distributed within yogurt or cottage cheese, jelly distributed within peanut butter, coloring or flavoring distributed within toothpaste, and flavoring or coloring distributed within pastry dough.

Reasonable variations and modifications are possible within the scope of the foregoing disclosure and the appended claims to the invention.

I claim:

1. Apparatus for injecting a stream of generally liquid material into a stream of generally plastic material comprising:

tee means having a generally straight tubular chamber of approximate diameter D and length of at least 2D with an upstream inlet and a downstream outlet, said tee means also having an intermediate inlet downstream of said upstream inlet, the downstream edge of said intermediate inlet being located at a distance of at least D upstream from said downstream outlet, said intermediate inlet having a diameter at least substantially equal to D, said intermediate inlet being operably connected to a plastic material supply means so as to permit the flow of plastic material through said intermediate inlet to said chamber;

a liquid material supply means operatively secured to said upstream inlet; and at least one ribbon tube having an upstream end and a downstream end, said ribbon tube being operably connected at its upstream end to said upstream inlet so as to provide a flow of liquid material through said ribbon tube into said chamber, said ribbon tube extending downstream into said chamber parallel to the central axis of said chamber to an imaginary plane perpendicular to the central axis of said chamber and at a distance within the range of from 0 to about ½ D upstream from the downstream edge of said intermediate inlet.

2. The apparatus of claim 1 wherein a plurality of said ribbon tubes are equally spaced around the circumstance of said chamber at positions approximately equidistant between the central axis of said chamber and the tubular surface of said chamber and wherein a line passing through and perpendicular to the central axes of the two adjacent ribbon tubes positioned nearest said intermediate inlet opening is bisected by a plane passing through the central axis of said chamber and the center of said intermediate inlet opening.

3. The apparatus of claim 2 wherein there are four said ribbon tubes.

4. The apparatus of claim 2 wherein said ribbon tubes have a flattened downstream end forming a downstream opening with a cross section of substantially greater length than width.

5. The apparatus of claim 4 wherein said downstream ends of said ribbon tubes are positioned so that the short dimension of each said downstream end is perpendicular to and bisected by a radius drawn perpendicular to the central axis of said chamber.

6. The apparatus of claim 5 wherein there are four said ribbon tubes.

7. Apparatus for injecting a stream of generally liquid material into a stream of generally plastic material comprising:

tee means having a generally straight tubular chamber with substantially uniform diameter D and length of at least 2D with an upstream inlet and a downstream outlet, said tee means also having an intermediate inlet downstream of said upstream inlet, the downstream edge of said intermediate inlet being located a distance of at least D upstream from said downstream outlet, said intermediate inlet having a diameter at least substantially equal to D, said intermediate inlet being operably connected to a plastic material supply means so as to permit the flow of plastic material through said intermediate inlet to said chamber;

a liquid material supply means operatively secured to said upstream inlet; and at least one ribbon tube having an upstream end and a flattened downstream end forming a downstream ribbon tube opening with a cross section of substantially greater length than width, each said ribbon tube being operably connected at its upstream end to said upstream inlet so as to provide a flow of liquid material through said ribbon tube into said mixing chamber.

8. The apparatus of claim 7 wherein each said ribbon tube extends downstream into said chamber parallel to the central axis of said chamber to an imaginary plane perpendicular to the central axis of said chamber and at a distance within the range of zero to about ½ D upstream from the downstream edge of said intermediate inlet.

9. The apparatus of claim 8 wherein each said ribbon tube extends downstream a distance within the range of about ⅛ D to about ¼ D upstream from the downstream edge of said intermediate inlet.

10. The apparatus of claim 9 wherein four of said ribbon tubes are equally spaced around the circumference of said chamber at positions approximately equidistant between the central axis of said chamber and the tubular surface of said chamber; wherein a line passing through and perpendicular to the central axes of the two adjacent ribbon tubes positioned nearest said intermediate inlet opening is bisected by a plane passing through the central axis of said chamber and the center of said intermediate inlet opening; and wherein said downstream ends of said ribbon tubes are positioned so that the short dimension of each said downstream end is perpendicular to and bisected by a radius drawn perpendicular to the central axis of said chamber.

11. The apparatus of claim 7 wherein each said ribbon tube extends downstream into said chamber parallel to the central axis of said chamber to an imaginary plane perpendicular to the central axis of said chamber and at a distance within the range of about ¼ D to about D downstream from the downstream edge of said intermediate inlet.

12. The apparatus of claim 7 wherein a plurality of said ribbon tubes are equally spaced around the circumference of said chamber at positions approximately equidistant between the central axis of said chamber and the tubular surface of said chamber and wherein a line passing through and perpendicular to the central axes of the two adjacent ribbon tubes positioned nearest said intermediate inlet opening is bisected by a plane passing through the central axis of said chamber and the center of said intermediate inlet opening.

13. The apparatus of claim 12 wherein there are four said ribbon tubes.

14. The apparatus of claim 7 wherein said downstream ends of said ribbon tubes are positioned so that the short dimension of each said downstream end is perpendicular to and bisected by a radius drawn perpendicular to the central axis of said chamber.

15. The apparatus of claim 14 wherein there are four said ribbon tubes.

16. Apparatus for injecting a stream of a second material into a stream of a first material comprising:

tee means having a generally straight tubular chamber of approximate diameter D and length of at least 2D with an upstream inlet and a downstream outlet, said tee means also having an intermediate inlet downstream of said upstream inlet, the downstream edge of said intermediate inlet being located a distance of at least D upstream from said downstream outlet, said intermediate inlet having a diameter at least substantially equal to D, said intermediate inlet being operably connected to a first material supply means so as to permit the flow of said first material through said intermediate inlet to said chamber;

a second material supply means operatively secured to said upstream inlet; and a plurality of ribbon tubes each having an upstream end and a flattened downstream end forming a downstream ribbon tube opening with a cross section of substantially greater length than width, each said ribbon tube being operably connected at its upstream end to said upstream inlet so as to provide a flow of said second material through said ribbon tubes into said mixing chamber.

17. The apparatus of claim 16 wherein said ribbon tubes are equally spaced around the circumference of said chamber at positions approximately equidistant between the central axis of said chamber and the tubular surface of said chamber and wherein a line passing through and perpendicular to the central axes of the two adjacent ribbon tubes positioned nearest said intermediate inlet opening is bisected by a plane passing through the central axis of said chamber and the center of said intermediate inlet opening.

18. The apparatus of claim 16 wherein said downstream ends of said ribbon tubes are positioned so that the short dimension of each said downstream end is perpendicular to and bisected by a radius drawn perpendicular to the central axis of said chamber.

19. The apparatus of claim 16 wherein each said ribbon tube extends downstream into said chamber parallel to the central axis of said chamber to an imaginary point perpendicular to the central axis of said chamber and at a distance within the range of about ¼ D to about D downstream from the downstream edge of said intermediate inlet.

20. The apparatus of claim 19 wherein each said ribbon tube extends downstream a distance within the range of about ½ D to about ⅔ D downstream from the downstream edge of said intermediate inlet.

21. The apparatus of claim 20 wherein four of said ribbon tubes are equally spaced around the circumference of said chamber at positions approximately equidistant between the central axis of said chamber and the tubular surface of said chamber; wherein a line passing through and perpendicular to the central axes of the two adjacent ribbon tubes positioned nearest said intermediate inlet opening is bisected by a plane passing through the central axis of said chamber and the center of said intermediate inlet opening; and wherein said downstream ends of said ribbon tubes are positioned so that the short dimension of each said downstream end is perpendicular to and bisected by a radius drawn perpendicular to the central axis of said chamber.

22. Apparatus for injecting a stream of a first material into a stream of a second material, said apparatus comprising:
tee means having a generally straight tubular chamber with an upstream inlet, a downstream outlet and an intermediate inlet of approximate diameter D downstream of said upstream inlet, said intermediate inlet being operably connected to a first material supply means so as to provide a flow of said first material through said intermediate inlet to said chamber;
a second material supply means operatively secured to said upstream inlet; and
a plurality of ribbon having an upstream end and a downstream end and being operably connected at its upstream end to said upstream inlet so as to provide a flow of said second material through said ribbon tube into said chamber, each said ribbon tube extending downstream into said chamber to a point located from 0 to about ½ D upstream from the downstream edge of said intermediate inlet.

23. Apparatus in accordance with claim 22 wherein said plurality of said ribbon tubes are equally spaced around the circumference of said chamber at positions approximately equidistant between the central axis of said chamber and the tubular surface of said chamber and wherein a line passing through and perpendicular to the central axes of the two adjacent ribbon tubes positioned nearest said intermediate inlet opening is bisected by a plane passing through the central axis of said chamber and the center of said intermediate inlet opening.

24. Apparatus in accordance with claim 23 wherein there are four said ribbon tubes.

25. Apparatus in accordance with claim 23 wherein said ribbon tubes have a flattened downstream end forming a downstream opening with a cross section of substantially greater length than width.

26. Apparatus in accordance with claim 25 wherein said downstream ends of said ribbon tubes are positioned so that the short dimension of each said downstream end is perpendicular to and bisected by a radius drawn perpendicular to the central axis of said chamber.

27. Apparatus in accordance with claim 26 wherein there are four said ribbon tubes.

* * * * *

UNITED STATES PATENT AND TRADEMARK OFFICE
CERTIFICATE OF CORRECTION

PATENT NO. : 3,886,973
DATED : June 3, 1975
INVENTOR(S) : Alfred W. Kinney

It is certified that error appears in the above—identified patent and that said Letters Patent are hereby corrected as shown below:

Column 9, claim 22, line 18, after "ribbon", the words --- tubes, each --- should be inserted.

Signed and Sealed this

Twelfth Day of April 1977

[SEAL]

Attest:

RUTH C. MASON
*Attesting Officer*

C. MARSHALL DANN
*Commissioner of Patents and Trademarks*